May 5, 1953 R. T. SPEDDING 2,637,594
SPRAY UNIT FOR TRACTORS
Filed June 21, 1949 2 SHEETS—SHEET 2

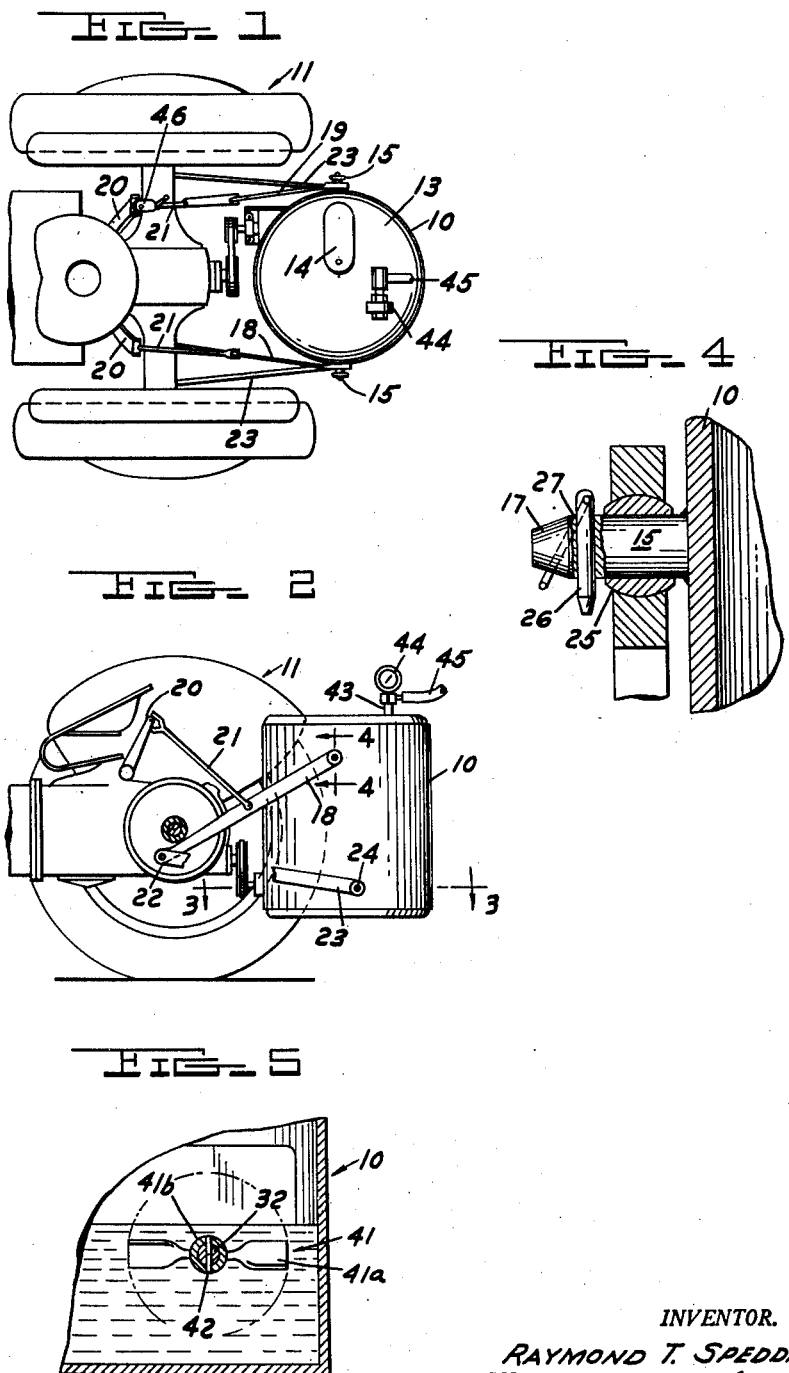

INVENTOR.
RAYMOND T. SPEDDING
BY
ATTORNEY

Patented May 5, 1953

2,637,594

UNITED STATES PATENT OFFICE 2,637,594

SPRAY UNIT FOR TRACTORS

Raymond T. Spedding, Detroit, Mich., assignor to Dearborn Motors Corporation, Highland Park, Mich., a corporation of Delaware Application June 21, 1949, Serial No. 100,351

2 Claims. (Cl. 299—30)

This invention relates to a spraying unit adapted for actuation by tractors or other prime movers having a power-take-off unit, and particularly to a spraying unit for tractors having hydraulically controlled hitch links.

Heretofore spraying outfits for orchard or general farm use had to be transported on a specially built platform secured to the tractor or towed behind on a trailer attached to the tractor and, obviously, therefore, such outfits could not be conveniently attached to the tractor and the tractor power-take-off. Consequently, a very considerable amount of time and effort has been involved in mounting and demounting the spraying outfit. Furthermore, in filling the spray tank with a solution, much inconvenience is experienced in maneuvering the spraying equipment so mounted adjacent to the loading point.

Accordingly, it is an object of this invention to provide a spraying unit which is completely mountable on the hydraulically controlled hitch links of a tractor, thereby simplifying the loading and transporting of such unit.

Another object of this invention is to provide a spraying unit having a pump driven by the power-take-off of the tractor through the medium of a belt drive to such power-take-off, and so arranged as to utilize the hitch link leveling adjustment commonly provided on tractors having hydraulic lifting mechanism, to conveniently permit assembly and tensioning of the belt drive.

The specific nature of this invention as well as other objects and advantages thereof, will become apparent to those skilled in the art from the following detailed description, taken in conjunction with the attached sheets of drawings, on which, by way of preferred example only, is illustrated one embodiment of this invention.

On the drawings:

Figure 1 is a top view of the spraying unit shown mounted on and supported by the hydraulically controlled hitch links of a tractor.

Figure 2 is a side elevational view of the spraying unit mounted on the tractor, with one of the wheels of the tractor removed to better illustrate the manner of supporting the tank.

Figure 4 is an enlarged detail sectional view taken along the plane 4—4 of Figure 2.

Figure 5 is an enlarged cross sectional detail view taken along the plane 5—5 of Figure 3.

As shown on the drawings:

Figure 3:
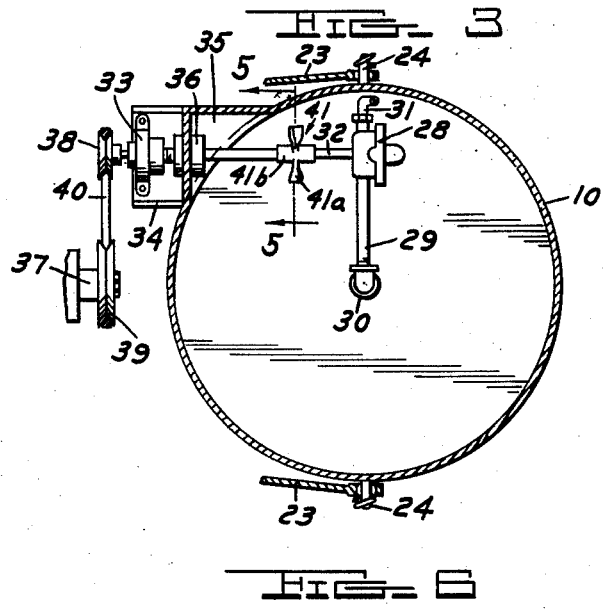
Figure 3 is an enlarged cross sectional view taken along the plane 3—3 of Figure 2.

There is shown in Figures 1 and 2 a tank 10 mounted on a tractor 11 by the hydraulically controlled hitch links indicated by the numerals 18 and 19 respectively. Tank 10 is preferably of cylindrical construction and is provided with a cover 13 having a removable cap 14 for access to the interior for filling with any desired solution. Exteriorly and near the top of tank 10, there is welded a pair of diametrically opposed mounting pins 15 provided with conically shaped ends as best shown at 17 in Figure 4. A corresponding pair of pins 24 is similarly secured near the bottom of tank 10 for a purpose to later appear. Pins 15 are provided for mounting tank 10 on the opposed lower links 18 and 19.

The hydraulic lifting mechanism preferably utilized with this invention is the one associated with the well-known Ford tractor and such mechanism comprises a pair of opposed lifting arms 20 actuated by a hydraulic cylinder (not shown) contained within the tractor. A pair of links 21 connect the lifting arms 20 with lower links 18 and 19 for raising such lower links. One such link is of telescoping construction and is provided with a crank 46 for changing the length of such link, whereby any device mounted on the lower links can be leveled. The lower links 18 and 19 are pivotally connected to the rear axle housing of tractor 11 as shown at 22 in Figure 2. One end of a pair of opposed stay bars 23 is also pivotally connected to the axle housing at 22 while the other ends of such bars are pivotally connected to the respective pins 24 near the bottom of tank 10 as shown in Figure 2, spherical bearings being suitably mounted in each of stay bars 23 for such pivotal mounting. The pivotal axis of stay bars 23 relative to the tractor is coincident with the pivotal axis of links 18 and 19. The usual spherical bearing 25 is mounted in each link 18 and 19 near the outward extremity of such links and each bearing is respectively engageable with a corresponding pin 15. Clevis pins 26 are inserted in transverse holes 27 in each pin 15 and 24 to prevent accidental displacement of the members respectively mounted thereon.

A centrifugal pump 28 is provided to force the spray liquid out of the tank under high pressure and such pump is mounted on a suitable base (not shown) affixed to the bottom of tank 10. A horizontally-disposed pipe 29 is connected to pump 28 and a pipe elbow 30 secured to the free end of such pipe and spaced from the bottom of the tank is provided to admit the solution contained in tank 10 to pump 28. A suitable fitting 31 is connected to the discharge side of pump 28 for connection of a discharge pipe 43 thereto. Pump 28 is driven by a shaft 32 horizontally supported at one end by a bearing 33 while the other end is suitably connected to the pump shaft. Bearing 33 is mounted on a bracket 34 welded or otherwise secured to tank 10. Tank 10 is deformed outwardly as shown at 35 where shaft 32 passes therethrough, and a suitable stuffing box 36 is there provided to eliminate leakage. Shaft 32 is disposed parallel to the power-take-off shaft 37 of the tractor so that a pulley 38 provided on the end of shaft 32 will be in general alignment with pulley 39 secured to the power-take-off, hence permitting a belt 40 to surround each of such pulleys for driving shaft 32. Hence pulley 38 is disposed in the same general vertical plane as pulley 39.

It will also be appreciated that pulleys 38 and 39 may be replaced by suitable sprockets and in such case a drive chain will be utilized in place of belt 40.

An agitator 41 comprising essentially a two-bladed propeller 41a welded to a piece of tubing 41b is mounted on shaft 32 within tank 10 as shown in Figure 3. Such agitator is provided to thoroughly agitate the contents of tank 10 in order to maintain spray ingredients in suspension. Agitator 41 is secured to shaft 32 by a transverse pin 42 as shown in Figure 5. Discharge pipe 43 projects through cover 13, and a pressure-regulating valve 44 is secured to the end of such pipe whereby the pressure of the fluid discharged may be conveniently regulated. A hose 45 is connected to the discharge side of gauge 44 and may in turn be connected to the spray nozzle (not shown).

Figure 6:
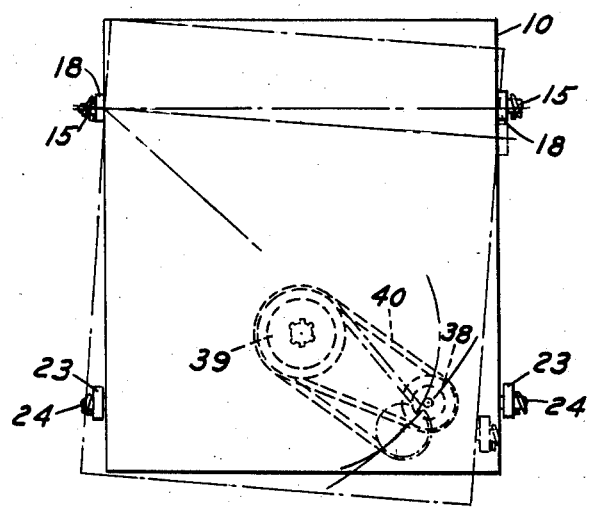
Figure 6 is a schematic view showing the manner in which the belt drive is tensioned.

Tank 10 when dismounted is readily and conveniently hitched by backing the tractor up against tank 10, whereupon lower links 18 and 19 are engaged with pins 15 by slipping bearings 25 over such pins and then inserting clevis pins 26. Stay bars 23 are connected in the same manner to pins 24 provided near the bottom of tank 10 whereupon the tank may be raised to a transporting position as shown in Figure 2 by actuation of the hydraulic mechanism to raise lifting arms 20. When such tank has been raised, the tank is tilted as shown in dotted outline in Figure 6 by lengthening the upper link 21 through actuation of leveling crank 46. When the tank has been tilted to approximately the degree shown in Figure 6, belt 40 may then be conveniently placed about pulleys 38 and 39, whereupon the leveling crank 46 is turned until tank 10 assumes a level position. Such movement effects a greater spacing between pulleys 38 and 39 as indicated in Figure 6, thus effectively tightening belt 40 whereupon drive pump 28 and agitator 41 may be readily driven by the power-take-off shaft of the tractor.

From the foregoing description it is apparent to those skilled in the art that there is here provided a spray tank and associated mechanism for use with the hydraulically operated lifting mechanism of a tractor that can be readily and easily mounted and transported with a minimum of manual effort on the part of the operator. Additionally, the spray pump utilized in conjunction with such tank is conveniently driven from the power-take-off shaft of the tractor, and assembly and tensioning of the belt or chain forming such drive is quickly effected in a manner not heretofore utilized.

It will be recognized that the belt or chain tightening adjustment feature herein disclosed is not limited to the specific application of a spray pump, but may be utilized with any tractor carried implement having a mechanism driven by a belt connection to the power-take-off shaft of the tractor.

I claim:

1. For use on a tractor having a rotating power-take-off element having a peripheral power-transmitting surface, a pair of laterally-spaced draw bars and adjusting means for varying the height of said draw bars relative to each other; an implement having a rotatable power input element having a peripheral power-transmitting surface, means for mounting said implement on said draw bars with the peripheral surface of said power input element disposed in substantially the same transverse vertical plane as the peripheral surface of said power-take-off element and laterally offset from said power-take-off element, and an endless drive member at least partially lapping the peripheral surfaces of said power-take-off element and said power input element, whereby operation of said adjusting means to vary the relative height of the drawbars effects tilting of said implement about a longitudinal axis and adjustment of tension in said endless drive member.

2. For use on a tractor having a power-take-off pulley having a peripheral power-transmitting surface, a pair of laterally-spaced draw bars and adjusting means for varying the height of said draw bars relative to each other; a sprayer comprising a tank, a pump mounted in said tank, a power input pulley connected to said pump and having a peripheral power-transmitting surface, means for mounting said tank on and between said draw bars with the peripheral surface of said power input pulley disposed in substantially the same transverse vertical plane as the peripheral surface of said power-take-off pulley and laterally spaced from said power-take-off pulley, and an endless drive member at least partially lapping the peripheral surfaces of said power-take-off pulley and said power input pulley, whereby operation of said adjusting means to vary the relative height of the draw bars effects tilting of said implement about a longitudinal axis and adjustment of tension in said endless drive member.

RAYMOND T. SPEDDING.

References Cited in the file of this patent

UNITED STATES PATENTS

| Number | Name | Date |
| --- | --- | --- |
| 2,363,776 | Dale | Nov. 28, 1944 |
| 2,381,649 | Dalton | Aug. 7, 1945 |
| 2,424,468 | Keathley | July 22, 1947 |
| 2,440,422 | Westmoreland | Apr. 27, 1948 |
| 2,447,071 | Huffman | Aug. 17, 1948 |
| 2,494,175 | Hoder | Jan. 10, 1950 |
| 2,577,448 | Carr | Dec. 4, 1951 |